(12) United States Patent
Jung et al.

(10) Patent No.: US 12,111,082 B2
(45) Date of Patent: Oct. 8, 2024

(54) AIR CONDITIONING APPARATUS

(71) Applicant: LG ELECTRONICS INC., Seoul (KR)

(72) Inventors: Jaehwa Jung, Seoul (KR); Yongcheol Sa, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 275 days.

(21) Appl. No.: 17/792,489

(22) PCT Filed: Nov. 18, 2020

(86) PCT No.: PCT/KR2020/016242
§ 371 (c)(1),
(2) Date: Jul. 13, 2022

(87) PCT Pub. No.: WO2021/153887
PCT Pub. Date: Aug. 5, 2021

(65) Prior Publication Data
US 2023/0049970 A1    Feb. 16, 2023

(30) Foreign Application Priority Data

Jan. 28, 2020   (KR) .................. 10-2020-0010084

(51) Int. Cl.
*F25B 13/00*   (2006.01)
(52) U.S. Cl.
CPC ........ *F25B 13/00* (2013.01); *F25B 2313/003* (2013.01); *F25B 2313/007* (2013.01);
(Continued)
(58) Field of Classification Search
CPC .............. F25B 13/00; F25B 2313/003; F25B 2313/007; F25B 2313/0233; F25B 2313/02732; F24F 11/83
(Continued)

(56) References Cited

U.S. PATENT DOCUMENTS 5,947,373 A    9/1999  Saito et al.
6,220,341 B1   4/2001  Izumi et al.
(Continued)

FOREIGN PATENT DOCUMENTS

CN    202002393      10/2011
CN    102997495      3/2013
(Continued)

OTHER PUBLICATIONS

European Search Report issued in Application No. 20916951.5 dated Jan. 25, 2024.
(Continued)

*Primary Examiner* — Steve S Tanenbaum
(74) *Attorney, Agent, or Firm* — KED & ASSOCIATES (57) ABSTRACT

Provided is an air conditioning apparatus. The air conditioning apparatus includes an outdoor unit through which a refrigerant circulates, a plurality of indoor units through which water circulates, the plurality of indoor units comprising a first indoor heat exchanger and a second indoor heat exchanger, and a heat-exchange device configured to connect the outdoor unit to the indoor unit, the heat exchange device including a first heat exchanger and a second heat exchanger, in which the refrigerant and water are heat exchanged with each other. The heat exchange device includes a first inflow tube extending from the first indoor heat exchanger toward the first heat exchanger to guide a flow of the water, a second inflow tube extending from the second indoor heat exchanger toward the second heat exchanger to guide the flow of the water, a first pump provided in the first inflow tube and a second pump provided in the second inflow tube. When a portion of the indoor unit performs a heating operation, and the other portion of the indoor unit performs a cooling operation, when a total capacity required for the indoor unit is equal to or less than (Continued)

a set capacity, the first pump or the second pump operates, and when the total capacity required for the indoor unit exceeds the set capacity, the first pump and the second pump operate.

20 Claims, 5 Drawing Sheets (52) U.S. Cl.
CPC ................ *F25B 2313/0233* (2013.01); *F25B 2313/02732* (2013.01)

(58) Field of Classification Search
USPC ............................................................ 165/5
See application file for complete search history.

(56) References Cited

U.S. PATENT DOCUMENTS

| | | | | |
|---|---|---|---|---|
| 8,752,397 | B2* | 6/2014 | Yamashita | ................ F24F 3/06 62/277 |
| 10,619,892 | B2 | 4/2020 | Kim et al. | |
| 2011/0113802 | A1 | 5/2011 | Wakamoto et al. | |
| 2015/0330673 | A1* | 11/2015 | Honda | .................... F25B 13/00 62/324.1 |
| 2015/0369498 | A1 | 12/2015 | Motomura et al. | |
| 2016/0003499 | A1 | 1/2016 | Park et al. | |
| 2016/0209085 | A1 | 7/2016 | Kim et al. | |
| 2019/0346189 | A1 | 11/2019 | Saito et al. | |

FOREIGN PATENT DOCUMENTS

| | | |
|---|---|---|
| CN | 104838218 | 8/2015 |
| EP | 2 960 602 | 12/2015 |
| JP | 6-201220 | 7/1994 |
| JP | 2008-250974 | 10/2008 |
| JP | 2017-101855 | 6/2017 |
| JP | 2018-124046 | 8/2018 |
| KR | 10-0788477 | 12/2007 |
| KR | 10-2016-0091298 | 8/2016 |
| KR | 10-2019-0134181 | 12/2019 |
| WO | WO 2014/091572 | 6/2014 |
| WO | WO 2016/114557 | 7/2016 |

OTHER PUBLICATIONS

Chinese Office Action issued in Application No. 202080082705.6 dated Apr. 13, 2023.
Japanese Office Action dated Sep. 5, 2023 issued in Application No. 2022-545026.
Chinese Office Action dated Sep. 26, 2023 issued in Application No. 202080082705.6.
International Search Report dated Mar. 10, 2021 issued in Application No. PCT/KR2020/016242.

* cited by examiner

AIR CONDITIONING APPARATUS

CROSS-REFERENCE TO RELATED PATENT APPLICATIONS

This application is a U.S. National Stage Application under 35 U.S.C. § 371 of PCT Application No. PCT/KR2020/016242, filed Nov. 18, 2020, which claims priority to Korean Patent Application No. 10-2020-0010084, filed Jan. 28, 2020, whose entire disclosures are hereby incorporated by reference.

TECHNICAL FIELD

The present disclosure relates to an air conditioning apparatus.

BACKGROUND ART

Air conditioning apparatuses are apparatuses that maintain air within a predetermined space in the most proper state according to the use and purpose thereof. In general, such an air conditioning apparatus includes a compressor, a condenser, an expansion device, and evaporator. Thus, the air conditioning apparatus has a refrigerant cycle in which compression, condensation, expansion, and evaporation processes of a refrigerant are performed to cool or heat a predetermined space.

The predetermined space may be variously provided according to a place at which the air conditioning apparatus is used. For example, the predetermined space may be a home or an office.

When the air conditioning apparatus performs a cooling operation, an outdoor heat-exchanger provided in an outdoor unit may serve as a condenser, and an indoor heat-exchanger provided in an indoor unit may serve as an evaporator. On the other hand, when the air conditioning apparatus performs a heating operation, the indoor heat-exchanger may serve as the condenser, and the outdoor heat-exchanger may serve as the evaporator.

In recent years, according to environmental regulations, there is a tendency to limit the type of refrigerant used in the air conditioning apparatus and to reduce an amount of used refrigerant. To reduce an amount of refrigerant used, an air conditioning system has been proposed to perform cooling or heating by performing heat exchange between a refrigerant and a predetermined fluid. For example, the predetermined fluid may include water.

However, when some of a plurality of indoor units perform a heating operation, and others perform a cooling operation, at least two plate-type heat exchangers are provided in the heat exchange device, and water pumps are independently connected. Thus, in the case of a low load operation, since the two pumps operate to deteriorate efficiency.

Regarding a system that performs the cooling or heating through heat-exchange between a refrigerant and water, the air conditioning apparatus disclosed in Japanese Patent Publication No. 2008250974 (Sep. 29, 2008) discloses only a feature in which a flow rate of each of the pumps is adjusted using a flow control valve. As a result, in the case of the low load operation, all the pump may operate to deteriorate the efficiency.

DISCLOSURE OF INVENTION

Technical Problem

Embodiments provide an air conditioning apparatus that is capable of performing an efficient operation during a low load operation of an indoor unit.

Embodiments also provide an air conditioning apparatus in which only one of a plurality of pumps, which are independently connected to a heat exchanger of a heat exchange device, operates.

Solution to Problem

In an air conditioning apparatus according to an embodiment, in a case in which a total capacity required when a plurality of indoor units perform a simultaneous operation is less than a set capacity, i.e., when a low load simultaneous operation is performed, only one pump operates to improve efficiency.

In one embodiment, an air conditioning apparatus includes: an outdoor unit through which a refrigerant circulates; a plurality of indoor units through which water circulates, the plurality of indoor units including a first indoor heat exchanger and a second indoor heat exchanger; and a heat-exchange device configured to connect the outdoor unit to the indoor unit, the heat exchange device including a first heat exchanger and a second heat exchanger, in which the refrigerant and water are heat exchanged with each other.

The heat exchange device includes: a first inflow tube extending from the first indoor heat exchanger toward the first heat exchanger to guide a flow of the water; a second inflow tube extending from the second indoor heat exchanger toward the second heat exchanger to guide the flow of the water; a first pump provided in the first inflow tube; and a second pump provided in the second inflow tube.

When a portion of the indoor unit performs a heating operation, and the other portion of the indoor unit performs a cooling operation, and when a total capacity required for the indoor unit is equal to or less than a set capacity, the first pump or the second pump operates, and the total capacity required for the indoor unit exceeds the set capacity, the first pump and the second pump operate.

The set capacity may be less than a capacity of one of the pumps.

The air conditioning apparatus may further include: a first inlet tube extending from the first indoor heat exchanger toward the first pump to guide the flow of the water; a first inflow valve provided in the first inlet tube; a second inlet tube extending from the second indoor heat exchanger toward the second pump to guide the flow of the water; and a second inflow valve provided in the second inlet tube.

Each of the first inflow valve and the second inflow valve may include a three-way valve.

The air conditioning apparatus may further include: a first tube connected to a first port of the first inflow valve to extend to the first inflow tube; and a second tube connected to a first port of the second inflow valve to extend to the second inflow tube, wherein, when the total capacity required for the indoor unit exceeds the set capacity, the water may flow through the first tube and the second tube.

The air conditioning apparatus may further include: a first connection tube connected to a second port of the first inflow valve to extend to the second inflow tube; and a second connection tube connected to a second port of the second inflow valve to extend to the second inflow tube, wherein, when the total capacity required for the indoor unit is equal to or less than the set capacity, the water may flow through the first connection tube or the second connection tube.

The first tube and the second connection tube may be connected to each other at a first combination portion provided in the first inflow tube, and the second tube and the first connection tube may be connected to each other at a second combination portion provided in the second inflow tube.

The air conditioning apparatus may further include a branch tube configured to connect the first inflow tube to the second inflow tube.

The branch tube may extend from an outlet tube of the first pump toward an outlet tube of the second pump.

A flow control valve may be provided in the branch tube.

When the total capacity required for the indoor unit exceeds the set capacity, the flow control valve may be closed.

When the total capacity required for the indoor unit is equal to or less than the set capacity, the water may flow from a branch portion, which is disposed on the inflow tube provided with the operating pump among the first pump and the second pump, to the branch tube.

The air conditioning apparatus may further include: a first discharge tube extending from the first heat exchanger toward the first indoor heat exchanger to guide the flow of the water; and a second discharge tube extending from the second heat exchanger toward the second indoor heat exchanger to guide the flow of the water.

A first discharge valve may be provided in the first discharge tube, and a second discharge valve may be provided in the second discharge tube.

The air conditioning apparatus may further include: a first inlet tube extending from the first indoor heat exchanger toward the first pump to guide the flow of the water; a second inlet tube extending from the second indoor heat exchanger toward the second pump to guide the flow of the water; an inflow valve provided in each of the first inlet tube and the second inlet tube; a tube connected to a first port of the inflow valve to extend to the first inflow tube; and a connection tube connected to a second port of the inflow valve to extend to the second inflow tube, wherein the water may flow to the tube or the connection tube.

Advantageous Effects of Invention

According to the embodiment, the efficient operation may be performed during the low load operation of the indoor unit.

Particularly, even in the case of the simultaneous operation in which some indoor units perform the heating operation, and other indoor units perform the cooling operation, only some of the pumps may operate according to the load to secure the efficiency during the low load operation.

In addition, according to the embodiment, the water supply of the water passage may be controlled according to the load of the plurality of heat exchangers provided in the heat exchange device.

MODE FOR THE INVENTION

Hereinafter, some embodiments of the present invention will be described in detail with reference to the accompanying drawings. Exemplary embodiments of the present invention will be described below in more detail with reference to the accompanying drawings. It is noted that the same or similar components in the drawings are designated by the same reference numerals as far as possible even if they are shown in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 1:
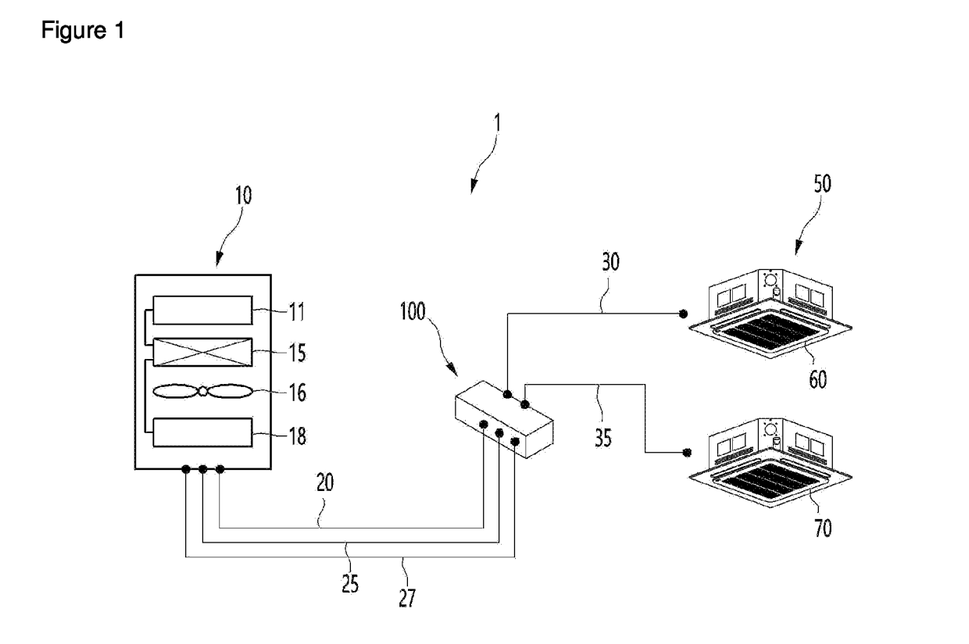
FIG. 1 is a schematic view illustrating a configuration of an air conditioning apparatus according to an embodiment.
Figure 2:
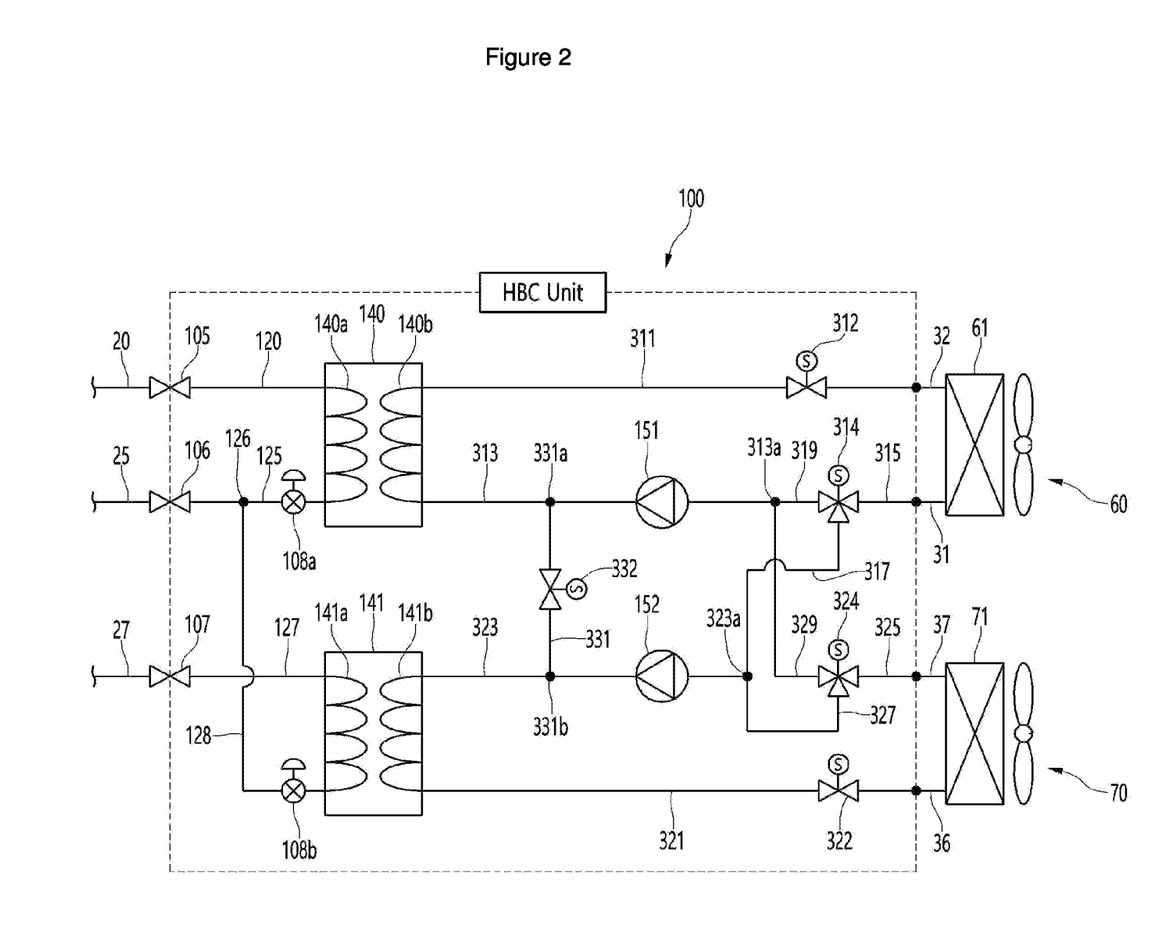
FIG. 2 is a cycle diagram illustrating the configuration of the air conditioning apparatus according to an embodiment.

FIG. 1 is a schematic view illustrating a configuration of an air conditioning apparatus according to an embodiment, and FIG. 2 is a cycle diagram illustrating the configuration of the air conditioning apparatus according to an embodiment.

Referring to FIGS. 1 and 2, an air conditioning apparatus 1 according to an embodiment includes an outdoor unit 10, an indoor unit 50, and a heat exchange device 100 connected to the outdoor unit 10 and the indoor unit 50.

The outdoor unit 10 and the heat exchange device 100 may be fluidly connected by a first fluid. For example, the first fluid may include a refrigerant. The refrigerant may flow through a refrigerant-side path of a heat exchanger provided in the heat change device 100 and the outdoor unit 10.

The outdoor unit 10 may include a compressor 11 and an outdoor heat exchanger 15. An outdoor fan 16 may be provided at one side of the outdoor heat exchanger 15 to blow external air toward the outdoor heat exchanger 15 so that heat exchange between the external air and the refrigerant of the outdoor heat exchanger 15 is performed. Also, a main electronic expansion valve 18 may be further provided in the outdoor unit 10.

The air conditioning apparatus 1 further include three tubes 20, 25, and 27 connecting the outdoor unit 10 to the heat exchange device 100. The three tubes 20, 25, and 27 include a first outdoor unit connection tube 20 as a gas tube (a high-pressure gas tube) through which a high-pressure gas refrigerant flows, a second outdoor unit connection tube 25 as a liquid tube through a liquid refrigerant flows, and a third outdoor unit connection tube 27 as a gas tube (a low-pressure gas tube) through which a low-pressure gas refrigerant flows.

That is, the outdoor unit 10 and the heat exchange device 100 may have a "three tube connection structure", and the refrigerant may circulate through the outdoor unit 10 and the heat exchange device 100 through the three tubes 20, 25, and 27.

The heat exchange device 100 and the indoor unit 50 may be fluidly connected by a second fluid. For example, the second fluid may include water. The water may flow through a water-side passage of a heat exchanger provided in the heat change device 100 and the outdoor unit 10. The heat exchanger may include a plate-type heat exchanger.

The indoor unit 50 may include a plurality of indoor units 60 and 70. The plurality of indoor units 60 and 70 include a first indoor unit 60 and a second indoor unit 70.

The air conditioning apparatus 1 further includes tubes 30 and 35 connecting the heat exchange device 100*a* to the indoor unit 50. The tubes 30 and 35 include two indoor unit connection tubes 30 and 35 connecting the heat exchange device 100*a* to the first and second indoor units 60 and 70.

The two indoor unit connection tubes 30 and 35 include a first connection tube 30 connecting the heat exchange device 100*a* to the first indoor unit 60 and a second connection tube 35 connecting the heat exchange device 100*a* to the second indoor unit 70.

The first connection tube 30 includes first and second indoor unit connection tubes 31 and 32. Also, the second connection tube 35 includes third and fourth indoor unit connection tubes 36 and 37.

The water may circulate through the heat exchange device 100*a* and the indoor unit 50 via the first and second connection tubes 30 and 35. Here, the number of indoor units increases, the number of tubes connecting the heat exchange device 100*a* to the indoor units may also increase.

According to the above-described configuration, the refrigerant circulating through the outdoor unit 10 and the heat exchange device 100 and the water circulating through the heat exchange device 100 and the indoor unit 50 may be heat-exchanged with each other through heat exchangers 140 and 141 provided in the heat exchange device 100, and water cooled or heated through the heat exchange may be heat-exchanged with indoor heat exchangers 61 and 71 provided in the indoor unit 50 to perform cooling or heating in an indoor space.

In the heat exchange device 100 includes a first heat exchanger 140 fluidly connected to the first indoor unit 60 and a second heat exchanger 141 fluidly connected to the second indoor unit 70.

The heat exchangers 140 and 141 may include a plate-type heat exchanger and be configured so that the water passages and the refrigerant passages are alternately stacked with each other.

The heat exchangers 140 and 141 include refrigerant passages 140*a* and 141*a* and water passages 140*b* and 141*b*. The refrigerant passages 140*a* and 141*a* may be fluidly connected to the outdoor unit 10, and the refrigerant discharged from the outdoor unit 10 may be introduced into the refrigerant passages 140*a* and 141*a*, and then the refrigerant passing through the refrigerant passages 140*a* and 141*a* may be introduced into the outdoor unit 10.

The water passages 140*b* and 141*b* may be fluidly connected to the indoor unit 50. Thus, the water discharged from the indoor unit 50 may be introduced into the water passages 140*b* and 141*b*, or the water passing through the water passages 141*b* an 141*b* may be introduced into the indoor unit 50.

The heat exchange device 100 includes a first service valve 105 connected to the first outdoor unit connection tube 20, a second service valve 106 connected to the second outdoor unit connection tube 25, and a third service valve 107 connected to the third outdoor unit connection tube 27.

The first to third outdoor unit connection tubes 20, 25, and 27 may be connected to the heat exchange device 100 through the first to third service valves 105, 106, and 107, and thus, the outdoor unit 10 and the heat exchange device 100 may realize a "three tube connection".

The first heat exchanger refrigerant tube 120 extends from the first service valve 105 to one end of the refrigerant passage 140*a* of the first heat exchanger 140, and the second heat exchanger refrigerant tube 125 extends from the second service valve 106 to the other end of the refrigerant passage 140*a* of the first heat exchanger 140. A first internal expansion valve 108*a* may be installed in the second heat exchanger refrigerant tube 125. The first internal expansion valve 108*a* may include an electronic expansion valve (EEV) that is capable of decompressing the refrigerant.

The heat exchanger device 100 further includes a third heat exchanger refrigerant tube 127 connected to the third service valve 107. That is, the third heat exchanger refrigerant tube 127 may be connected to the third outdoor unit connection tube 27 through the third service valve 107.

The third heat exchanger refrigerant tube 127 may be coupled to one end of the refrigerant passage 141*a* of the second heat exchanger 141.

The heat exchanger device 100 further includes a fourth heat exchanger refrigerant tube 128 extending from a refrigerant branch portion 126 of the second heat exchanger refrigerant tube 125 and then coupled to the other end of the refrigerant passage 141*a* of the second heat exchanger 141.

The first internal expansion valve 108*a* may be installed at one point of the second heat exchanger refrigerant tube 125 between the refrigerant branch portion 126 and the first heat exchanger 110.

A second internal expansion valve 108*b* may be installed in the fourth heat exchanger refrigerant tube 128. The second internal expansion valve 108*b* may include an electronic expansion valve (EEV) that is capable of decompressing the refrigerant.

For example, when the air conditioning apparatus 1 performs a simultaneous operation, at least a portion of the refrigerant, which is condensed in and discharged from the first heat exchanger 140, may be bypassed in the refrigerant branch portion 126 to flow through the fourth heat exchanger refrigerant tube 128 and then be introduced into the second heat exchanger 115.

A refrigerant passage-side of the heat exchange device 100 may be merely one embodiment and may have various structures through which the refrigerant flows.

Next, a water passage-side of the heat exchange device 100 will be described.

The heat exchange device 100 may include discharge tubes 311 and 321 respectively connected to ends of the water passages 140*b* and 141*b* of the heat exchangers 140 and 141.

In detail, the first discharge tube 311 may be connected to one end of the water passage 140*b* of the first heat exchanger 140, and a first discharge valve 312 may be provided in the first discharge tube 311.

The first discharge tube 311 is connected to the second indoor unit connection tube 32 to allow water to flow to the first indoor heat exchanger 61 of the indoor unit 50.

Also, the second discharge tube 321 may be connected to one end of the water passage 141*b* of the second heat exchanger 141, and a second discharge valve 322 may be provided in the second discharge tube 321. For example, each of the first and second discharge valves 312 and 322 may include a 2-way solenoid valve.

The second discharge tube 321 is connected to the third indoor unit connection tube 36 to allow water to flow to the second indoor heat exchanger 71 of the indoor unit 50.

Also, the heat exchange device 100 may include inflow tubes 313 and 323 respectively connected to the other ends of the water passages 140b and 141b of the heat exchangers 140 and 141.

Pumps 151 and 152 may be provided in the inflow tubes 313 and 323, and water in the water passages 140b and 141b may flow through the pumps 151 and 152.

In detail, the inflow tubes 313 and 323 include a first inflow tube 313 connected to the other end of the water passage 140b of the first heat exchanger 140 and a second inflow tube 323 connected to the other end of the water passage 141b of the second heat exchanger 141.

The first pump 151 may be provided in the first inflow tube 313, and the second pump 152 may be provided in the second inflow tube 323. That is, one pump may be provided in each inflow tube.

Water discharged from the indoor heat exchangers 61 and 71 may be discharged through the indoor unit connection tubes 31 and 37 and then introduced into the heat exchange device 100.

In detail, the water discharged from the first indoor heat exchanger 61 may flow through the first indoor unit connection tube 31 and then be introduced into the heat exchange device 100. The first indoor unit connection tube 31 may be connected to a first inlet tube 315 provided in the heat exchange device 100.

In addition, water discharged from the second indoor heat exchanger 71 may flow through the fourth indoor unit connection tube 37 and then be introduced into the heat exchange device 100. The fourth indoor unit connection tube 37 may be connected to a second inlet tube 325 provided in the heat exchange device 100.

Inflow valves 314 and 324 may be provided at outlet sides of the inlet tubes 315 and 325, respectively.

Also, the inflow valves 314 and 324 may control a flow direction of water passing through the indoor heat exchangers 61 and 71 through an opening and closing operation. That is, the inflow valves 314 and 324 may control the flow direction of the water so that the flow direction of the water is changed.

For example, each of the inflow valves 314 and 324 may include a three-way valve.

In detail, the water introduced from the inlet tubes 315 and 325, which are the inlet sides of the inflow valves 314 and 324, may flow to the tubes 327 and 319 or the connection tube 317 and 329, which are connected to the inflow valves 314 and 324.

For example, the tubes 327 and 319 may include a first tube 319 extending from a first port of the first inflow valve 314 and connected to the first inflow tube 313 and a second tube 327 extending from the first port of the second inflow valve 324 and connected to the second inflow tube 323.

Also, the connection tubes 317 and 329 may include a first connection tube 317 extending from a second port of the first inflow valve 314 and connected to the second inflow tube 323 and a second connection tube 329 extending from the second port of the second inflow valve 324 and connected to the first inflow tube 313.

That is, the tubes 319 and 317 extending from an outlet of the first inflow valve 314 may extend to the first inflow tube 313 and the second inflow tube 323 respectively, and the tubes 329 and 327 extending from an outlet of the second inflow valve 324 may extend the first inflow tube 313 and the second inflow tube 323, respectively.

Also, the first tube 319 and the second connection tube 329 may be connected to the first inflow tube 313 in the first combination portion 313a.

Also, the second tube 327 and the first connection tube 317 may be connected to the second inflow tube 323 in the second combination portion 323a.

The heat exchange device 100 may further include a branch tube 331 connecting the first inflow tube 313 to the second inflow tube 323.

In detail, the branch tube 331 may connect a first branch portion 331a of the first inflow tube 313 and a second branch portion 331b of the second inflow tube 323.

Also, the branch tube 331 may further include a flow control valve 332 capable of adjusting an amount of water flowing through the branch tube 331. The flow control valve 332 may include a 2-way solenoid valve.

For example, the branch portions 331a and 331b may be disposed between the pumps 151 and 152 and the heat exchangers 140 and 141.

Figure 3:
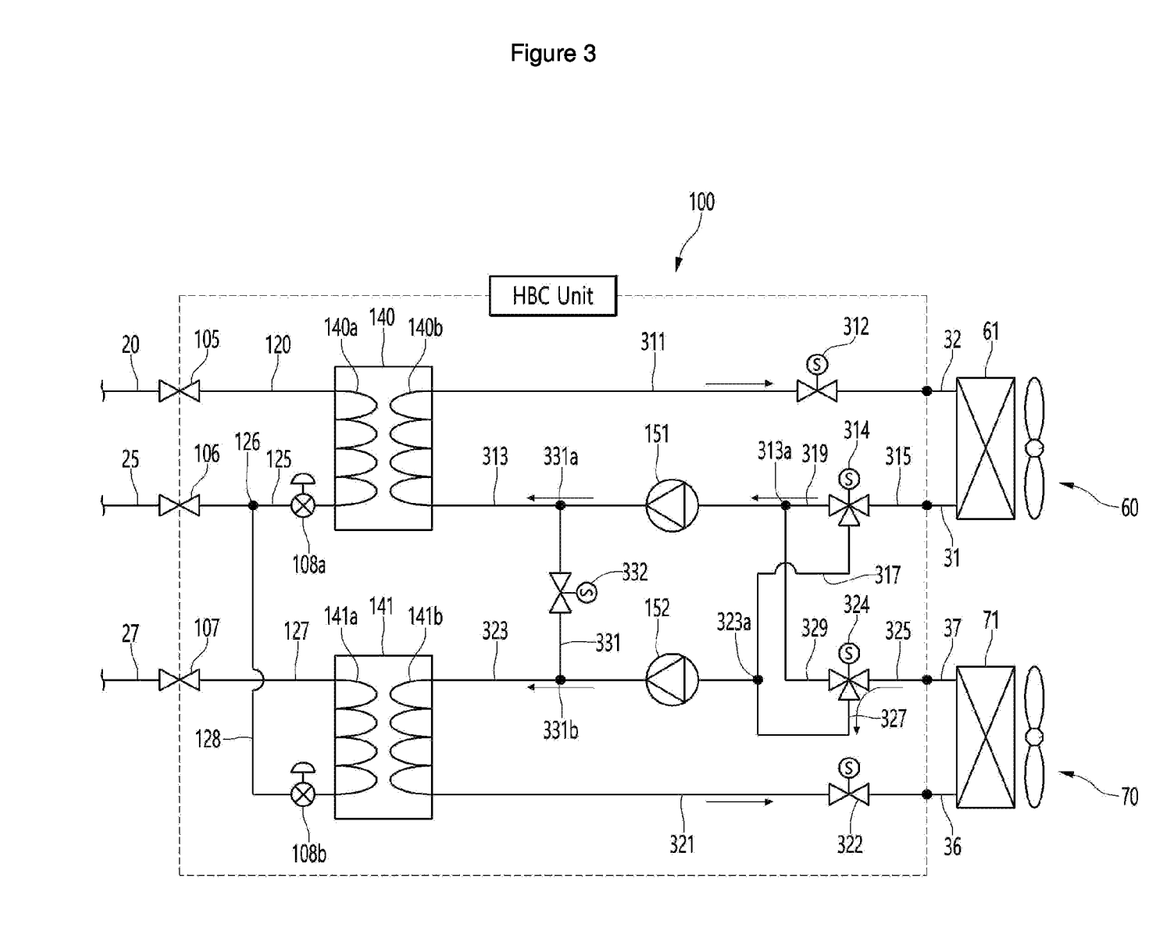
FIG. 3 is a cycle diagram illustrating a state in which water flows when all water pumps, which are provided in the heat exchange device, operate.
Figure 4:
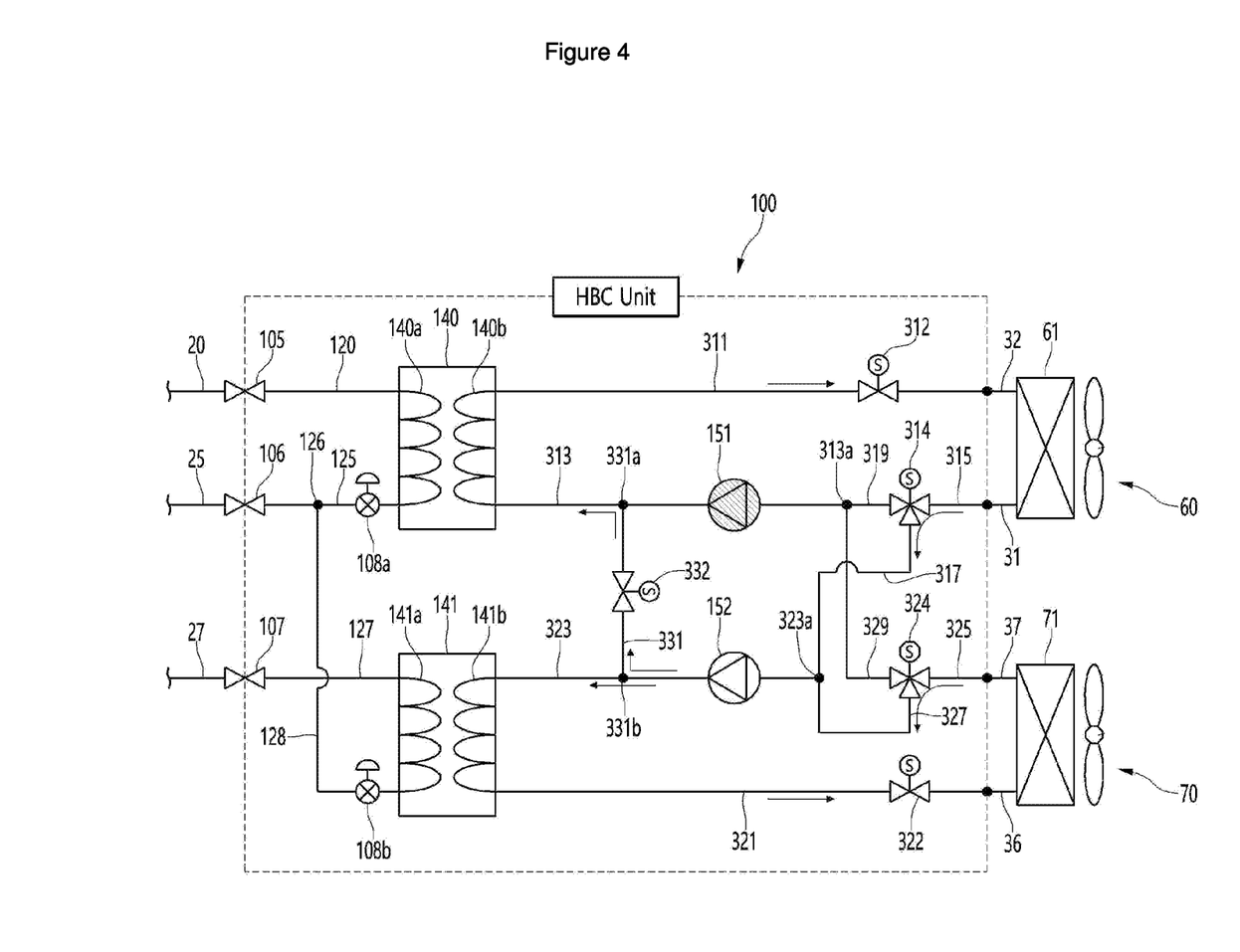
FIG. 4 is a cycle diagram illustrating a state in which water flows during a low-load correspondence operation of a simultaneous operation of the heat exchange device.
Figure 5:
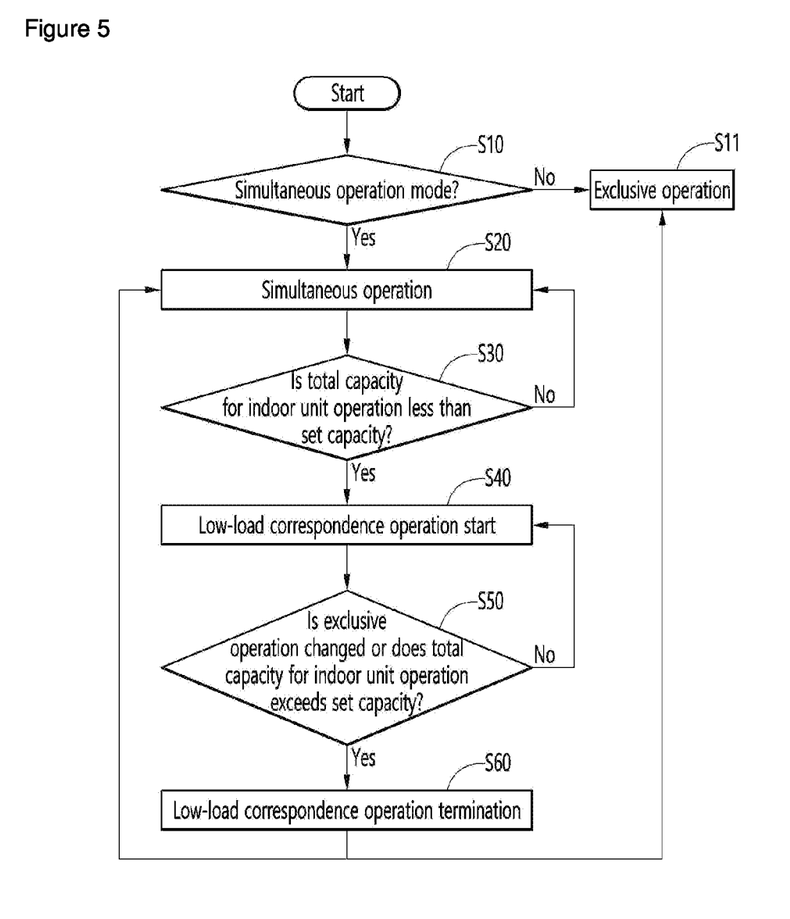
FIG. 5 is a flow chart illustrating a control method according to an operation of an indoor unit.

FIG. 3 is a cycle diagram illustrating a state in which water flows when all the water pumps, which are provided in the heat exchange device, operate, FIG. 4 is a cycle diagram illustrating a state in which water flows during a low-load correspondence operation of a simultaneous operation of the heat exchange device, and FIG. 5 is a flow chart illustrating a control method according to an operation of an indoor unit.

A flow of water according to an operation type of the indoor unit and a load of an operation of the indoor unit will be described with reference to FIGS. 3 to 5.

First, the cycle diagram illustrated in FIG. 3 illustrates a case in which all the heat exchangers 140 and 141 perform heat exchange, and when the pumps 151 and 152 respectively fluidly connected to the heat exchangers 140 and 141 operate.

When all the pumps 151 and 152 operate, one of the heat exchangers 140 and 141 performs heat exchange for a cooling operation, and the other heat exchanger performs heat exchange for a heating operation.

Alternatively, it may be a case that all the heat exchangers 140 and 141 perform heat exchange for the cooling or heating.

That is, the flow control valve 332 is closed, and water may flow to the respective heat exchangers 140 and 141 corresponding to the pumps 151 and 152.

In detail, the water discharged from the indoor heat exchangers 61 and 71 may pass through the inlet tubes 315 and 325 to flow to the tubes 319 and 327, which are outlets of the inflow valves 314 and 324 and then pass through the pumps 151 and 152 and be introduced into the heat exchangers 140 and 141.

Also, the water heat-exchanged in the heat exchangers 140 and 141 may flow through the discharge tubes 311 and 321 to flow back into the indoor heat exchangers 61 and 71.

That is, water flowing to the branch tube 331 and the first and second connection tubes 317 and 329 may not exist.

The cycle diagram illustrated in FIG. 4 illustrates a case in which all the heat exchangers 140 and 141 perform heat exchange, but only one of the plurality of pumps 151 and 152 operates.

When the air conditioner 1 performs the simultaneous operation, one of the heat exchangers 140 and 141 of the heat exchange device 100 performs the heat exchange for the cooling operation, and the other performs the heat exchange for the heating operation. Thus, all the two heat exchangers 140 and 141 operate.

However, in the case of a season such as the spring or the autumn, a load required for the indoor unit 50 may supply a sufficient flow rate through one pump. That is, since the pumps 151 and 152 are independently connected to the heat exchangers 140 and 141, there is a limitation of an inefficient operation during a low-load operation.

Also, when the air conditioner 1 performs an exclusive operation, only one heat exchanger needs to operate, but when the air conditioner 1 performs the simultaneous operation, the plurality of heat exchangers 140 and 141 have to operate.

To solve this limitation, the inflow tubes 313 and 323 provided with the pumps 151 and 152 may be connected to each other to supply water to the water passages of the two heat exchangers 140 and 141 using one pump.

For example, a case in which the first pump 151 is turned off will be described. Here, the second pump 152 may be turned off.

A flow of water introduced from the heat exchangers 140 and 141 through the discharge tubes 311 and 321 in the indoor heat exchangers 61 and 71 may be the same as a case in which all the pumps operate.

Since the first pump 151 is turned off, the water discharged from the first indoor heat exchanger 61 flows through the first inlet tube 315 to flow the second inflow tube 323 through the first connection tube 317 that is one outlet of the first inflow valve 314.

The water discharged from the second indoor heat exchanger 71 flows through the second inlet tube 325 to flow to the second tube 327, which is one outlet of the second inflow valve 324 and then is mixed with the water flowing through the first connection tube 317 in the second combination portion 323a.

The water mixed in the second combination portion 323a flows to the second inflow tube 323 through the second pump 152.

The water passing through the second pump 152 may be branched in the second branch portion 331b. Then, a portion of the water may be introduced into the second heat exchanger 141 through the second inflow tube 323, and the other portion may flow to the branch tube 331 and be introduced into the first heat exchanger 140 via the first inflow tube 313.

That is, the water may flow to the first heat exchanger 140 and the second heat exchanger 141 by using only one pump.

An amount of water introduced into the first heat exchanger 140 and the second heat exchanger 141 may be adjusted through the flow control valve 332 provided in the branch tube 331.

That is, the flow control valve 332 may adjust the amount of water according to heat-exchange efficiency required for the indoor unit so that the water is introduced into each of the heat exchangers 140 and 141.

Referring to FIG. 5, it is possible to determine whether only one or all of the pumps 151 and 152 operate.

That is, it may be determined whether the operation required for the indoor unit 50 is the simultaneous operation (S10).

In detail, if all the indoor units 50 are selected to perform the heating operation or the cooling operation, the exclusive operation mode may be performed (S11).

Also, if the indoor unit 50 is selected to partially perform the heating operation and partially perform the cooling operation, the simultaneous operation mode may be performed (S20).

When the simultaneous operation mode is performed, all the heat exchangers 140 and 141 of the heat exchange device 200 have to operate.

In this case, it may be determined whether the total capacity of the indoor unit is less than or equal to a set capacity (S30). The set capacity may be set in comparison with a capacity of each of the pumps.

For example, the set capacity may be less than a capacity of one pump. That is, a case in which the total capacity of the operation of the indoor unit is sufficient through the capacity of one pump may be referred to as a low-load operation.

For example, when the capacity of one pump is about 5 hp, the set capacity may be about 3 hp less than the 5 hp.

When the total capacity of the indoor unit operation is greater than the set capacity, two pumps are used to perform the operation, and if the indoor unit operation is less than the set capacity, one pump may be used to perform the operation.

That is, when the total capacity of the indoor unit operation is less than the set capacity, the low-load correspondence operation starts (S40), and the operation may be performed using only one pump as illustrated in FIG. 4.

Also, it may be determined that the indoor unit operation is changed to the exclusive operation, or the total capacity required for the indoor unit exceeds the set capacity (S50), and if the conditions are satisfied, the low-load correspondence operation may be terminated (S60).

When the low-load correspondence operation is terminated, the heat exchange device 100 may operate in the simultaneous operation or the exclusive operation mode according to an operation mode requested for the indoor unit 50.

DESCRIPTION OF THE SYMBOLS

1: Air conditioning apparatus
10: Outdoor unit
50: Indoor unit
100: Heat exchange device
140, 141: Heat exchanger
151, 152: Pump
314, 324: Inflow valve
313, 323: Inlet tube

The invention claimed is:

1. An air conditioning apparatus, comprising:
an outdoor unit through which a refrigerant circulates;
a plurality of indoor units through which water circulates, the plurality of indoor units comprising a first indoor heat exchanger and a second indoor heat exchanger; and
a heat-exchange device configured to connect the outdoor unit to the indoor unit, the heat exchange device comprising a first heat exchanger and a second heat exchanger, in which the refrigerant and water are heat exchanged with each other, wherein the heat exchange device comprises:
 a first inflow tube that extends from the first indoor heat exchanger toward the first heat exchanger to guide a flow of the water;
 a second inflow tube that extends from the second indoor heat exchanger toward the second heat exchanger to guide the flow of the water;
 a first pump provided in the first inflow tube; and
 a second pump provided in the second inflow tube, wherein when a first portion of the plurality of indoor units performs a heating operation and a second portion of the plurality of indoor units performs a cooling operation, when a total capacity required for the plurality of indoor units is equal to or less than a predetermined capacity, the first pump or the second pump operates, and when the total capacity required for the plurality of indoor units exceeds the predetermined capacity, the first pump and the second pump operate.

2. The air conditioning apparatus according to claim 1, wherein the predetermined capacity is less than a capacity of one of the first and second pumps.

3. The air conditioning apparatus according to claim 1, further comprising:
a first inlet tube that extends from the first indoor heat exchanger toward the first pump to guide the flow of the water;
a second inlet tube that extends from the second indoor heat exchanger toward the second pump to guide the flow of the water;
an inflow valve provided in each of the first inlet tube and the second inlet tube;
a tube connected to a first port of the inflow valve to extend to the first inflow tube; and
a connection tube connected to a second port of the inflow valve to extend to the second inflow tube, wherein the water flows to the tube or the connection tube.

4. The air conditioning apparatus according to claim 1, wherein the first heat exchanger and the second heat exchanger are plate type heat exchangers.

5. The air conditioning apparatus according to claim 1, further comprising:
a first inlet tube that extends from the first indoor heat exchanger toward the first pump to guide the flow of the water;
a first inflow valve provided in the first inlet tube;
a second inlet tube that extends from the second indoor heat exchanger toward the second pump to guide the flow of the water; and
a second inflow valve provided in the second inlet tube.

6. The air conditioning apparatus according to claim 5, wherein each of the first inflow valve and the second inflow valve comprises a three-way valve.

7. The air conditioning apparatus according to claim 6, further comprising:
a first tube that is connected to a first port of the first inflow valve and extends to the first inflow tube; and
a second tube that is connected to a first port of the second inflow valve and extends to the second inflow tube, wherein when the total capacity required for the plurality of indoor units exceeds the predetermined capacity, the water flows through the first tube and the second tube.

8. The air conditioning apparatus according to claim 7, further comprising:
a first connection tube that is connected to a second port of the first inflow valve and extends to the second inflow tube; and
a second connection tube that is connected to a second port of the second inflow valve and extends to the second inflow tube, wherein when the total capacity required for the plurality of indoor units is equal to or less than the predetermined capacity, the water flows through the first connection tube or the second connection tube.

9. The air conditioning apparatus according to claim 8, wherein the first tube and the second connection tube are connected to each other at a first combination portion provided in the first inflow tube, and the second tube and the first connection tube are connected to each other at a second combination portion provided in the second inflow tube.

10. The air conditioning apparatus according to claim 1, further comprising:
a first discharge tube that extends from the first heat exchanger toward the first indoor heat exchanger to guide the flow of the water; and
a second discharge tube that extends from the second heat exchanger toward the second indoor heat exchanger to guide the flow of the water.

11. The air conditioning apparatus according to claim 10, wherein a first discharge valve is provided in the first discharge tube, and a second discharge valve is provided in the second discharge tube.

12. The air conditioning apparatus according to claim 1, further comprising a branch tube configured to connect the first inflow tube to the second inflow tube.

13. The air conditioning apparatus according to claim 12, wherein the branch tube extends from an outlet tube of the first pump toward an outlet tube of the second pump.

14. The air conditioning apparatus according to claim 12, wherein a flow control valve is provided in the branch tube.

15. The air conditioning apparatus according to claim 14, wherein when the total capacity required for the plurality of indoor units exceeds the predetermined capacity, the flow control valve is closed.

16. The air conditioning apparatus according to claim 14, wherein when the total capacity required for the plurality of indoor units is equal to or less than the predetermined capacity, the water flows from a branch portion, which is disposed on the inflow tube provided with the operating pump among the first pump and the second pump, to the branch tube.

17. An air conditioning apparatus, comprising:
an outdoor unit through which a refrigerant circulates;
a plurality of indoor units through which water circulates, the plurality of indoor units comprising a first indoor heat exchanger and a second indoor heat exchanger; and
a heat-exchange device configured to connect the outdoor unit to the indoor unit, the heat exchange device comprising a first heat exchanger and a second heat exchanger, in which the refrigerant and water are heat exchanged with each other, wherein the heat exchange device comprises:
a first inflow tube that extends from the first indoor heat exchanger toward the first heat exchanger to guide a flow of the water;
a second inflow tube that extends from the second indoor heat exchanger toward the second heat exchanger to guide the flow of the water;
a first pump provided in the first inflow tube;
a second pump provided in the second inflow tube; and
a branch tube configured to connect the first inflow tube to the second inflow tube, wherein when a first portion of the plurality of indoor units performs a heating operation and a second portion of the plurality of indoor units performs a cooling operation, when a total capacity required for the plurality of indoor units is equal to or less than a predetermined capacity, the first pump or the second pump operates and the water flows through the branch tube, and when the total capacity required for the plurality of indoor units exceeds the predetermined capacity, the first pump and the second pump operate.

18. The air conditioning apparatus according to claim 17, wherein the branch tube extends from an outlet tube of the first pump toward an outlet tube of the second pump.

19. The air conditioning apparatus according to claim 17, wherein a flow control valve is provided in the branch tube.

20. The air conditioning apparatus according to claim 19, wherein when the total capacity required for the plurality of indoor units exceeds the predetermined capacity, the flow control valve is closed, and wherein when the total capacity required for the plurality of indoor units is equal to or less than the predetermined capacity, the water flows from a branch portion, which is disposed on the inflow tube provided with the operating pump among the first pump and the second pump, to the branch tube.

\* \* \* \* \*